United States Patent
Kirby et al.

(10) Patent No.: US 12,437,054 B2
(45) Date of Patent: Oct. 7, 2025

(54) MEMORABLE SECURE, AND STRONG PASSWORD GENERATOR ENHANCED WITH GAMIFICATION AND MACHINE LEARNING

(71) Applicant: Bank of America Corporation, Charlotte, NC (US)

(72) Inventors: Harry Kirby, Tega Cay, SC (US); Olga Kocharyan, Matthews, NC (US); Robert A. Levandowski, North Granby, CT (US); Marci Landy, Waxhaw, NC (US); Julius D. Jeffreys, Grove City, OH (US); Anthony D. Pedretti, Downers Grove, IL (US)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 18/382,620

(22) Filed: Oct. 23, 2023

(65) Prior Publication Data

US 2025/0131083 A1    Apr. 24, 2025

(51) Int. Cl.
G06F 21/46    (2013.01)

(52) U.S. Cl.
CPC .................................. *G06F 21/46* (2013.01)

(58) Field of Classification Search
CPC ......... G06F 21/46; G06F 21/45; G06N 20/20; G06N 20/00
See application file for complete search history.

(56) References Cited

U.S. PATENT DOCUMENTS

| | | | |
|---|---|---|---|
| 7,367,053 B2 | 4/2008 | Sanai et al. | |
| 7,793,108 B2 | 9/2010 | Narayanaswami et al. | |
| 10,423,775 B1 * | 9/2019 | Kane-Parry | G06F 21/46 |
| 11,727,108 B2 * | 8/2023 | Learned | G06F 16/951 726/6 |
| 12,299,092 B1 * | 5/2025 | Jones, Jr. | H04L 63/1408 |
| 2019/0121953 A1 * | 4/2019 | Chari | G06F 21/35 |
| 2020/0026843 A1 * | 1/2020 | Anwar | G06F 21/40 |
| 2020/0042694 A1 * | 2/2020 | Karpovsky | G06Q 10/06 |
| 2021/0182378 A1 * | 6/2021 | Farivar | G06F 21/46 |
| 2022/0050894 A1 * | 2/2022 | Miracolo | G06N 20/00 |
| 2022/0292497 A1 * | 9/2022 | Miller | G06Q 20/108 |
| 2023/0252114 A1 * | 8/2023 | Cabrera Lozoya | G06F 40/253 726/7 |

\* cited by examiner

*Primary Examiner* — James R Turchen
(74) *Attorney, Agent, or Firm* — Weiss & Arons LLP (57) ABSTRACT

Systems and methods for automating the generation of a strong, secure, and memorable password using gamification. Systems may include a computer configured to receive words and phrases from a user using a gamification tool, use a machine learning model to eliminate words and phrases found when searching open-source intelligence (OSINT) available about the user, use the machine learning model to identify portions of the non-eliminated units of information, and use the machine learning model to combine the portions into memorable password options. Systems may include the computer configure to use the machine learning model to eliminate any of the password options found when searching OSINT, present a subset of the non-eliminated password options to the user, receive the selected password from the user, use the machine learning model to generate an obfuscated reminder for the selected password, and provide the obfuscated reminder to the user.

17 Claims, 7 Drawing Sheets

MEMORABLE SECURE, AND STRONG PASSWORD GENERATOR ENHANCED WITH GAMIFICATION AND MACHINE LEARNING

FIELD OF TECHNOLOGY

Aspects of the disclosure relate to automated password generation. Specifically, aspects of the disclosure relate to using a machine learning model to automate the generation of memorable passwords.

BACKGROUND OF THE DISCLOSURE

Remembering passwords is a significant concern. Accounts a user accesses frequently may be easy to remember provided the password is not too complex. However, passwords that are simple to remember may also be simple for nefarious parties to guess. Furthermore, even easy to remember passwords for accounts one rarely accesses may be difficult to remember. A user's brain may compartmentalize the password as non-critical information which the user does not need to remember.

Current password management storage and creation solutions may not offer a way to customize the generation of password options that are strong, yet memorable. Passwords generated from the creation solutions may focus on creating a strong password, buy may not be memorable to the standard user and thus require storage in password wallets or written solutions that are both susceptible to breach and risk.

Creating memorable passwords may lead a user to use words and concepts familiar to them, words common to the general population, repeat the password for multiple accounts, and use sequences of characters or sequential passwords, repetitive numbers, or keyboard walking. A sequential password may include a change from "password1234" to "password1235." A repetitive number password may include "1111" or "3333." Keyboard walking may include passwords found in sequential characters on the keyboard such as "Qwerty."

However, to make a strong password, these practices are discouraged. Common advice for making a strong password may include using a mix of uppercase letters, lowercase letters, numbers, and symbols, creating separate passwords for each account independently, avoiding common dictionary words, and avoiding the use of repetitive or sequential characters.

Even when the user utilizes password management, storage, or creation solutions to manage most of their passwords, the user may still need to remember the password that allows them to access that solution. The user may also be prohibited from using such a solution in certain circumstances, such as passwords allowing access to their employer's systems. Thus, the use of such solutions doesn't eliminate the need for creating secure and memorable passwords.

Current password generation solutions may require information used to generate the password to be stored at the local device or in a network, without deletion. For example, the information may be stored in a computer's read-only memory (ROM). Keeping this data may make it more likely that an attack to access the data may reveal information from which a selected password may be generated.

Therefore, there is a need for an apparatus and method for the creation of passwords which are strong and memorable.

SUMMARY OF THE DISCLOSURE

Provided may be apparatus and methods for the generation of a strong, secure, and memorable password. Provided may be apparatus and methods for the generation of a strong, secure, and memorable password using gamification. Provided may be apparatus and methods for automating aspects of the generation of a strong, secure, and memorable password.

Methods may include a computer running a machine learning model to provide a gamification tool to a user.

Methods may include the computer receiving a first list. The first list may be generated by the user when using the gamification tool. The first list may include words, phrases, or words and phrases.

Methods may include the computer receiving a second list. The second list may include units of information about the user from the user, from sources provided by the user, or from the user and from sources provided by the user.

Methods may include using the computer to run a generative pre-trained transformer (GPT) machine learning model fed open-source intelligence (OSINT) available about the user, fed the second list, or fed OSINT available about the user and the second list to identify a third list. The third list may include units of information related to the OSINT available about the user, related to the second list, and related to the OSINT available about the user and related to the second list.

Methods may include using the computer to run a machine learning model to eliminate any member of the first list which is found in the second list or the third list. The method may include leaving a subset of the first list which was not found in the second list or the third list. The machine learning model may be a GPT machine learning model. The machine learning model may be a machine learning model that is not a GPT machine learning model.

Methods may include using the computer to run a machine learning model to identify portions of a sampling of the subset of the first list not found in the second list or the third list. The machine learning model may be a GPT machine learning model. The machine learning model may be a machine learning model that is not a GPT machine learning model.

Methods may include using the computer to run a machine learning model to combine the portions into password options. The machine learning model may be a GPT machine learning model. The machine learning model may be a machine learning model that is not a GPT machine learning model.

Methods may include using the computer to run the GPT machine learning model to eliminate any of the password options found when searching OSINT for a word found in a dictionary or a proper name of a person, character, product, or organization. The method may include leaving a subset of the password options which was not found when searching OSINT.

Methods may include using the computer to present to the user the subset of the password options.

Methods may include receiving at the computer a selected password from the subset of password options.

Methods may include using the computer to run a machine learning model to generate an obfuscated reminder for the selected password. The obfuscated reminder may contain a reminder for each portion of the selected password. The machine learning model may be a GPT machine learning model. The machine learning model may be a machine learning model that is not a GPT machine learning model.

Methods may include using the computer to provide the obfuscated reminder to the user.

Methods may further include the computer running a machine learning model to generate another obfuscated reminder for the selected password which may be less obfuscated than the previous obfuscated reminder. The machine learning model may be a GPT machine learning model. The machine learning model may be a machine learning model that is not a GPT machine learning model.

Methods may further include the computer providing the less obfuscated reminder to the user. The less obfuscated reminder may be provided to the user when the user cannot remember the selected password.

Methods may include where the subset of the first list which was not eliminated comprises at least two words, phrases, or words and phrases.

Methods may include where the units of information about the user from sources provided by the user. Sources may include data storage in a desktop computer, data storage in a laptop computer, data stored in a tablet computer, data stored in a mobile device, and data storage on servers in off-site locations.

Methods may include where the selected password is stored using NFT blockchain technology.

Methods may include where the selected password is not stored on any local device.

Methods may include where the first list is stored in a memory on a local device. Methods may include where the first list is not stored at a central storage location. Methods may include where the first list is erased after a password is selected.

Methods may include wherein OSINT includes internet, public government data, media, public commercial data, academic and professional publications, dictionaries, and gray literature.

Methods may further include substituting a character class other than a lower-case letter, an upper-case letter, or a number for a lower-case letter, an upper-case letter, or a number.

Methods may include the portions being portions that do not form a word found in a dictionary or have an appearance of a word found in a dictionary. Methods may include the password options being password options that do not form a word found in a dictionary or have an appearance of a word found in a dictionary.

Methods may include the computer running a machine learning model to select portions, password options, or portions and password options which are memorable to the user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Provided may be apparatus and methods for the generation of a strong, secure, and memorable password. Provided may be apparatus and methods for the generation of a strong, secure, and memorable password using gamification. Provided may be apparatus and methods for automating aspects of the generation of a strong, secure, and memorable password.

A strong password may be a password not easily guessed by a third party. A secure password may be a password not easily determined by a third party when using OSINT available about the one making the password. A memorable password may be a password which is memorable to the user who chose the password.

Methods may include where OSINT includes internet, public government data, media, public commercial data, academic and professional publications, dictionaries, and gray literature. Internet may include social media websites, blogs, publications, news cites, YouTube, and the like. Public government data may include government reports, telephone directories, press conferences, and the like. Media may include printed publications, radio, television, and the like.

Commercial data may include location data or metadata such as metadata related to the user's online requests, publicly available commercial databases, commercial assessments, and the like. Academic and professional publications may include information derived from theses, journal articles, symposia, conferences, and the like. Gray literature may include research and materials produced by organizations that may be available to the public, but not through the traditional publication and distribution channels mentioned above. These may include patents, white papers, government, and financial compliance documents, and the like.

Methods may include the computer receiving a first list. The first list may include units of information about the user from the user and sources provided by the user.

Sources provided by the user may include data storage in a desktop computer, data storage in a laptop computer, data storage in a tablet computer, data storage in a mobile device, and data storage on servers in off-site locations such as on the cloud.

Methods may include using the computer to run a GPT machine learning model fed OSINT available about the user to identify a second list. The second list may include units of information related to the OSINT available about the user.

Methods may include using the computer to run a GPT machine learning model to derive a third list. The third list may include units of information which are inferred by the GPT machine learning model from the first list and the second list.

Methods may include the computer running a machine learning model, such as a GPT machine learning model, with units of information in the second list and/or the third list, obtained as described, to determine words, or other data elements derived from such words through common substitutions, abbreviations, mnemonics, acronyms, or the like, that the model determines can be inferred as likely elements of a password that the user might choose themselves based on information about the user available to the model. The units of information may be added to the units of information in the first list, the second list, and the third list as units of information to avoid when generating password options.

Methods may include using the computer to run a machine learning model to provide a gamification tool to a user.

Methods may include the computer receiving a fourth list. The fourth list may be generated by the user when using the gamification tool. The fourth list may include words, phrases, or words and phrases.

Gamification may be the application of typical elements of game playing to other areas of activity. Gamification may include point scoring, competition with others, and rules of play. Gamification may encourage participation by adding games or game-like elements to a task.

Gamification may include allowing the user to select words and/or phrases based on a game. The game may include a game that familiarizes a user with uncommon dictionary word and/or phrase that an average speaker of that language may not know. The uncommon dictionary word and/or phrase may be one which another party trying to guess the user's password may not associate with a word in the user's common language. The word and/or phrase may be memorable to the user because the user used the word and/or phrase to win a game.

Gamification may include allowing the user to select words and/or phrases based on game that helps to increase a user's problem solving skills, memory, intelligence, or some other thought-based improvement. The user may remember the word as it may be linked to winning a game, solving a problem, overcoming a challenge, or some other memorable event.

Gamification may include allowing the user to use a word and/or phrase related to self-improvement. The word and/or phrase may be a motto, slogan, or other form of positive reinforcement that may be unique to the user. The word and/or phrase may be memorable to the user because they selected it, but it may be a word and/or phrase that is not associated with the user by another party.

Gamification may include allowing the user to use a word and/or phrase related to a positive reinforcement. The positive reinforcement may be an affirmation that is memorable to the user but not associated with the user by another party.

Methods may include using the computer to run a machine learning model to reject any of the words, phrases, or words and phrases from the fourth list which are found in the first list, the second list, or the third list.

Methods may include using the computer to run the GPT machine learning model to repeat the steps of providing gamification to the user, receiving additional words, phrases, or words and phrases generated by the user using the gamification, and rejecting any of the additional words, phrases, or words and phrases which are found in the first list, the second list, or the third list, until the fourth list includes at least two words, phrases, or words and phrases which are not rejected.

Methods may include where the fourth list is stored in a memory on a local device. Methods may include where the fourth list is not stored at a central storage location. Methods may include where the fourth list is erased after a password is selected.

Methods may further include the computer storing the words and phrases generated using gamification in a local memory. Methods may further include the computer storing the password options in a local memory. Local memory may include direct-access data storage media. Local memory may include random-access memory (RAM). Local memory may include hard disks, CD-RWs, DVD-RWs and the older magnetic tapes and drum memory. Methods may further include the computer destroying, after receiving the selected password, the units of information. The local memory may be in electronic communication with the computer. The local memory may be in physical proximity to the computer.

Methods may include using the computer to run the machine learning model to identify portions of a sampling of the two or more words, phrases, or words and phrases.

Methods may further include substituting in a portion a character class other than a lower-case letter, an upper-case letter, or a number for a lower-case letter, an upper-case letter, or a number. Character classes may include lower-case letters such as a-z, upper-case letters such as A-Z, numbers such as 0-9, and common punctuation symbols such as ~!@#$ % ^&*( )_-+={[}]|\:;"'<,>.?/, "extended" characters used in non-English languages using Roman script such as characters incorporating diacritical or accent marks, single- or multi-byte Unicode characters encoding glyphs from non-Roman-script languages such as Mandarin Chinese, Korean, or Arabic, or single- or multi-byte characters representing pictographic concepts not particular to any language, such as "emoji."

The user may or may not choose to restrict the model from using part or all those character classes in the generation of a portion.

Methods may include using the computer to run the machine learning model to combine the portions into password options.

Methods may further include substituting in a password option a character class other than a lower-case letter, an upper-case letter, or a number for a lower-case letter, an upper-case letter, or a number. Character classes may include lower-case letters such as a-z, upper-case letters such as A-Z, numbers such as 0-9, and common punctuation symbols such as ~!@#$ % ^&*( )_-+={[}]|\:;"'<,>.?/, "extended" characters used in non-English languages using Roman script such as characters incorporating diacritical or accent marks, single- or multi-byte Unicode characters encoding glyphs from non-Roman-script languages such as Mandarin Chinese, Korean, or Arabic, or single- or multi-byte characters representing pictographic concepts not particular to any language, such as "emoji."

The user may or may not choose to restrict the model from using part or all those character classes in the generation of a password option.

Methods may include using the computer to run the GPT machine learning model to eliminate any of the password options found when searching OSINT for a word found in a dictionary or a proper name of a person, character, product, or organization. The method may include leaving a subset of the password options which was not found when searching OSINT.

Methods may include checking for sequential passwords, repetitive numbers, or keyboard walking. If found, methods may include eliminating the password option from consideration by the user.

Methods may include considering known exposures and breaches of passwords. Methods may use machine learning to crawl known breaches and confirm this password, and close variations, are not already known or do not already exist.

Methods may include using the computer to present to the user the subset of the password options.

Methods may include receiving at the computer a selected password from the subset of password options.

Methods may include the computer running a machine learning model to select portions, password options, or portions and password options which are memorable to the user.

Methods may include the computer running a machine learning model to select portions, password options, or portions and password options which are memorable to the user. A memorable portion or password option may be considered, for the purposes of this application, a portion or password option that contains at least 70% of the characters of a previous portion or password option of a selected password by the user, a relevant word, or similar.

Methods may include storing the selected password using non-fungible token (NFT) blockchain technology. Methods may include storing the selected password in an NFT blockchain.

Methods may include where the selected password is not stored on any local device.

Methods may include using the computer to run a machine learning model to generate an obfuscated reminder for the selected password. The obfuscated reminder may contain a reminder for each portion of the selected password. The machine learning model may be a GPT machine learning model. The machine learning model may be a machine learning model that is not a GPT machine learning model.

Methods may include using the computer to provide the obfuscated reminder to the user.

The obfuscated reminder may be a set of reminders where each component of the password has its own reminder. The obfuscated reminder may be a grouping of words to help the user remember the portions of the password and the order of those portions. The obfuscated reminder may be a grouping of words that forms a full sentence to help the user remember the portions of the password and the order of those portions. The obfuscated reminder may help the user to remember the password when the user has forgotten the actual selected password.

Methods may further include the computer running a machine learning model to generate another obfuscated reminder for the selected password which may be less obfuscated than the previous obfuscated reminder. The machine learning model may be a GPT machine learning model. The machine learning model may be a machine learning model that is not a GPT machine learning model.

Methods may further include the computer providing the less obfuscated reminder to the user. The less obfuscated reminder may be provided to the user when the user cannot remember the selected password.

Methods may further include the user selecting a new password after a period. The period may be an arbitrary period including 90 days, 180 days, a year, or any other suitable period. The period may be set according to the strength of the selected password. For a stronger password, a longer period may be set. For a weaker password, a short period of time may be set. The user may set frequency for updating the password. The user may set frequency for updating the password based on requirements imposed by the user's employer. The user may set frequency for updating the password based on requirements imposed by a website utilized by the user.

The computer running the machine learning model such as a GPT machine learning model may include a computer processor, a computer's central processing unit (CPU), a graphic-processing unit (GPU), separate element specifically for processing neural-network algorithms, or any other suitable system. A computer processor which may include a computer's CPU may run the machine learning model including the GPT machine learning model. A system's GPU may run the machine learning model including the GPT machine learning model. A separate element specifically for processing neural-network algorithms, including the Neural Engine found in Apple Silicon chips, may run the machine learning model including the GPT machine learning model.

Methods may include the computer running a machine learning model selecting portions and/or password options which are memorable to the user. A memorable portion and/or password option, in some embodiments, may be considered, for the purposes of this application, a portion and/or password option that contains at least 70% of the characters of one of a previous portion of a password, a relevant noun, or similar. A memorable portion and/or password option may contain at least 80% of the characters. A memorable portion and/or password option may contain at least 90% of the characters.

Methods may include the portions being portions that do not form a word found in a dictionary or have an appearance of a word found in a dictionary. Methods may include the password options being password options that do not form a word found in a dictionary or have an appearance of a word found in a dictionary.

Each of the password options may be a password option that does not form a word found in a dictionary or have an appearance of a word found in a dictionary. The password option, as a whole, may be a password option that does not form a word found in a dictionary or have an appearance of a word found in a dictionary. A part of the password option may be a password option that does not form a word found in a dictionary or have an appearance of a word found in a dictionary.

Methods may include units of information obtained from sources pertaining to the user such as closed-source intelligence (CSINT) about the user. CSINT may include paid-for intelligence, such as business intelligence reports, market updates, and the like. For example, paid-for commercial reports and assessments, such as from Dun and Bradstreet. CSINT may include intelligence that requires a trusted partnership before information is shared.

Methods may further include the computer running a machine learning model with units of information obtained as above to determine words, or other data elements derived from such words through common substitutions, abbreviations, mnemonics, acronyms, or the like, that the model determines can be inferred as likely elements of a password that the user might choose themselves based on information about the user available to the model. That information may include data from OSINT, CSINT, or other data sources available to the model.

Methods may further include the computer running a GPT machine learning model to reject password options generated by a machine learning model on the basis that they contain units of information or data elements derived from those units of information that the GPT machine learning model has determined can be inferred as likely elements of a password that the user might choose themselves. This GPT machine learning model may draw upon OSINT data to process the password options and conclude regarding a predictability of a password option.

In some embodiments, a portion may include one to ten characters. A portion may include one to eight characters. A portion may include two to eight characters. A portion may contain any other reasonable number of characters.

In some embodiments, a password option may contain two to twenty portions. A password option may contain two to fifteen portions. A password option may contain three to ten portions. A password option may contain any other reasonable number of portions.

In some embodiments, a password option may contain at least four characters. A password option may contain at least five characters. A password option may contain at least six characters. A password option may contain at least seven characters. A password option may contain at least eight characters.

Each password option may contain at least two character classes. Each password option may contain at least three character classes. Each password option may contain at least four character classes. Character classes include lower-case letters, upper-case letters, numbers, common punctuation symbols, extended characters used in non-English languages using Roman script, single- or multi-byte Unicode characters encoding glyphs from non-Roman-script languages, and single- or multi-byte characters representing pictographic concepts not particular to any language.

The computer may eliminate password options found within three character substitutions of a list of words generated when searching OSINT for a user. A password may be eliminated when found within two character substitutions. A password may be eliminated when found within one character substitution.

For example, words and/or phrases may be obtained from winning a word game. For example, the words conundrum, ubiquitous, galvanize, and zenith may be less common words that the user used to win a game.

An OSINT review of the user may reveal that galvanize is a word the user posts in social media. The machine learning model may eliminate these two from the list of user information.

The machine learning model may identify portions from the subset of words and/or phrases which Re from remain, Co from conundrum, Ub from ubiquitous, and Zeth from zenith.

The machine learning model may replace the C of Co with the sign @. The machine learning model may replace the Ze of Zeth with 0.

The machine learning model may derive a password option of Re@oUb0th.

The machine learning model may generate an obfuscated reminder for the selected password of main, drum, quit, and zen, showing a dictionary word for each portion. The machine learning model may generate a more obfuscated reminder for the selected password of R6, C9, U10, and Z6, showing the first letter of the words and the number of letters in the word.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
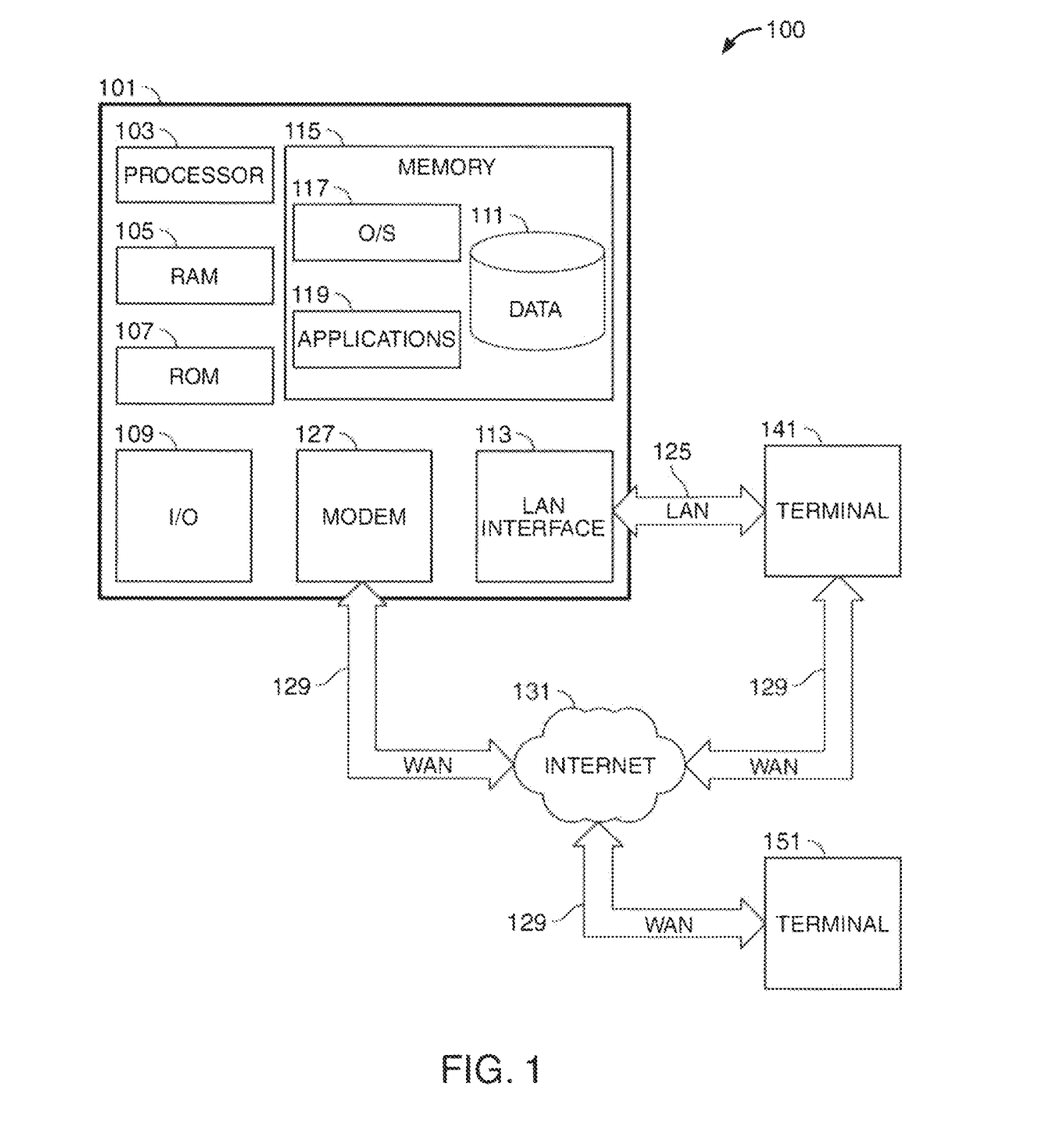
FIG. 1 shows an illustrative block diagram in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit (CPU), for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components, such as Graphics Processing Unit (GPU), EEPROM, Flash memory, neural-network processing elements, or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments where tasks are performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement particular data types. The invention may also be practiced in distributed computing environments where tasks are performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
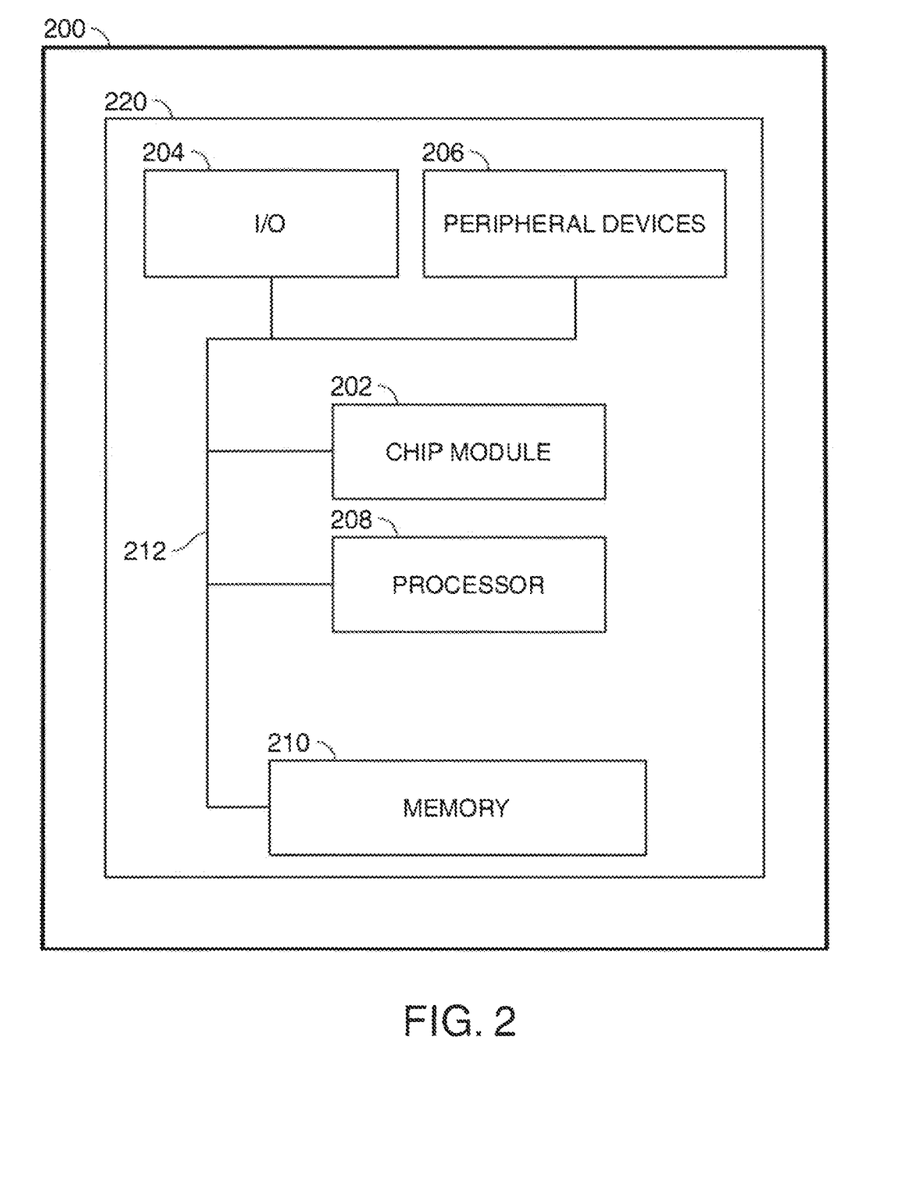
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
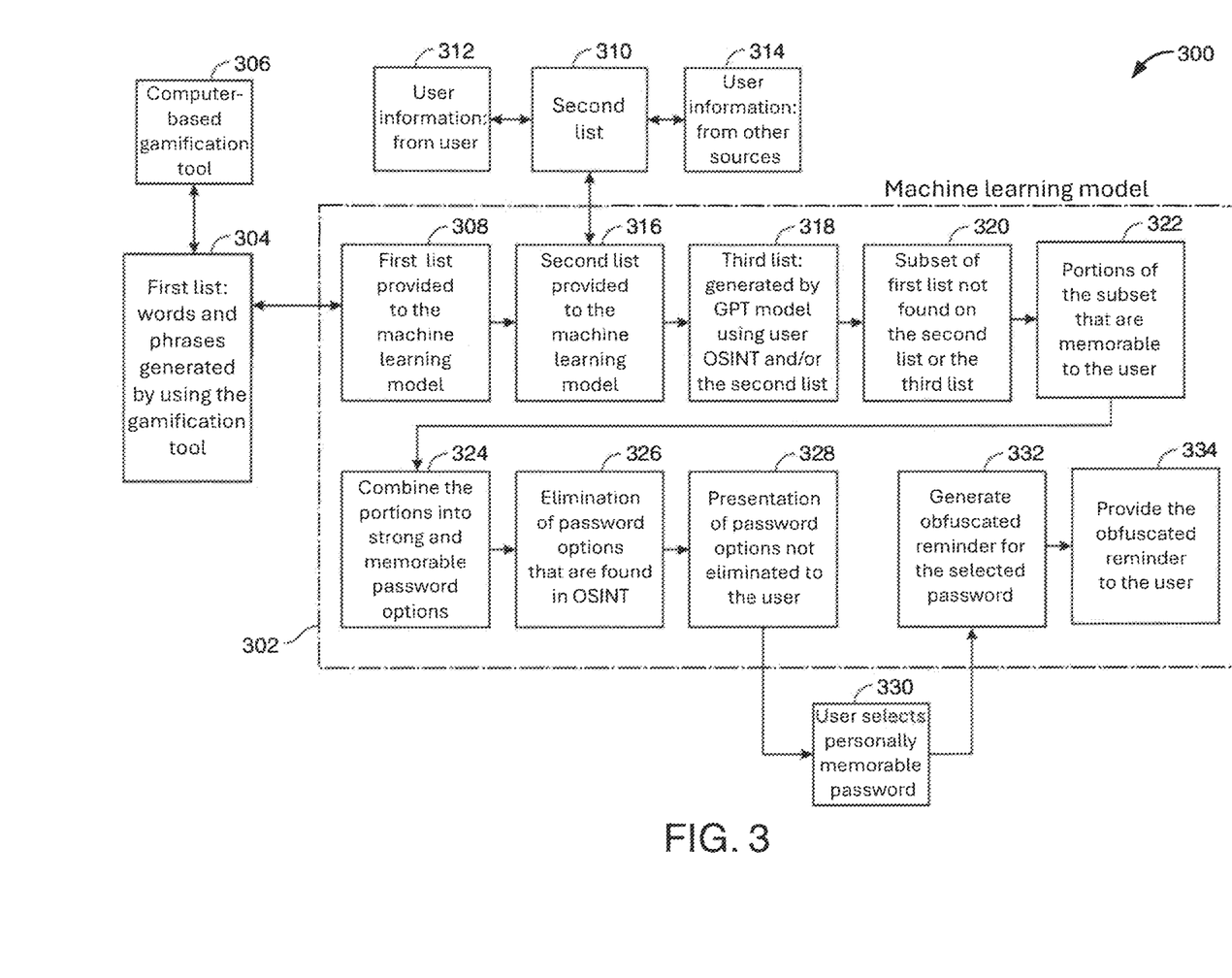
FIG. 3 shows an illustrative block diagram in accordance with principles of the disclosure.

FIG. 3 shows a flow diagram 300. Flow diagram 300 may include machine learning model 302. A user using a computer may provide first list 304 to machine learning model at 308. First list 304 may include words and phrases. First list 304 may be generated when the user uses computer-based gamification tool 306. The user using a computer may provide second list 310 to machine learning model at 316. Second list 310 may include user information. User information may include information about the user from the user 312 and information sources containing information about the user 314.

Machine learning model at 318 may identify a third list by using a GPT machine learning model fed information related to OSINT available about the user and the second list. Machine learning model at 320 may eliminate items found on the second list or the third list from the first list, leaving a subset of the first list that was not eliminated.

Machine learning model at 322 may use the subset of first list not eliminated at 320 and identify portions of the user information in the subset that are memorable to the user. Machine learning model at 324 may combine portions into password options which are strong and memorable. Machine learning model at 326 may determine password options appearing in OSINT and eliminate them from the password options. Machine learning model at 328 may use the subset of password options not eliminated at 326 and presents them to the user. At 330, the user may select the password most memorable to them. Machine learning model at 332 may generate an obfuscated reminder for the selected password. Machine learning model at 334 may provide the obfuscated reminder to the user. The obfuscated reminder may remind the user of the selected password.

Figure 4A:
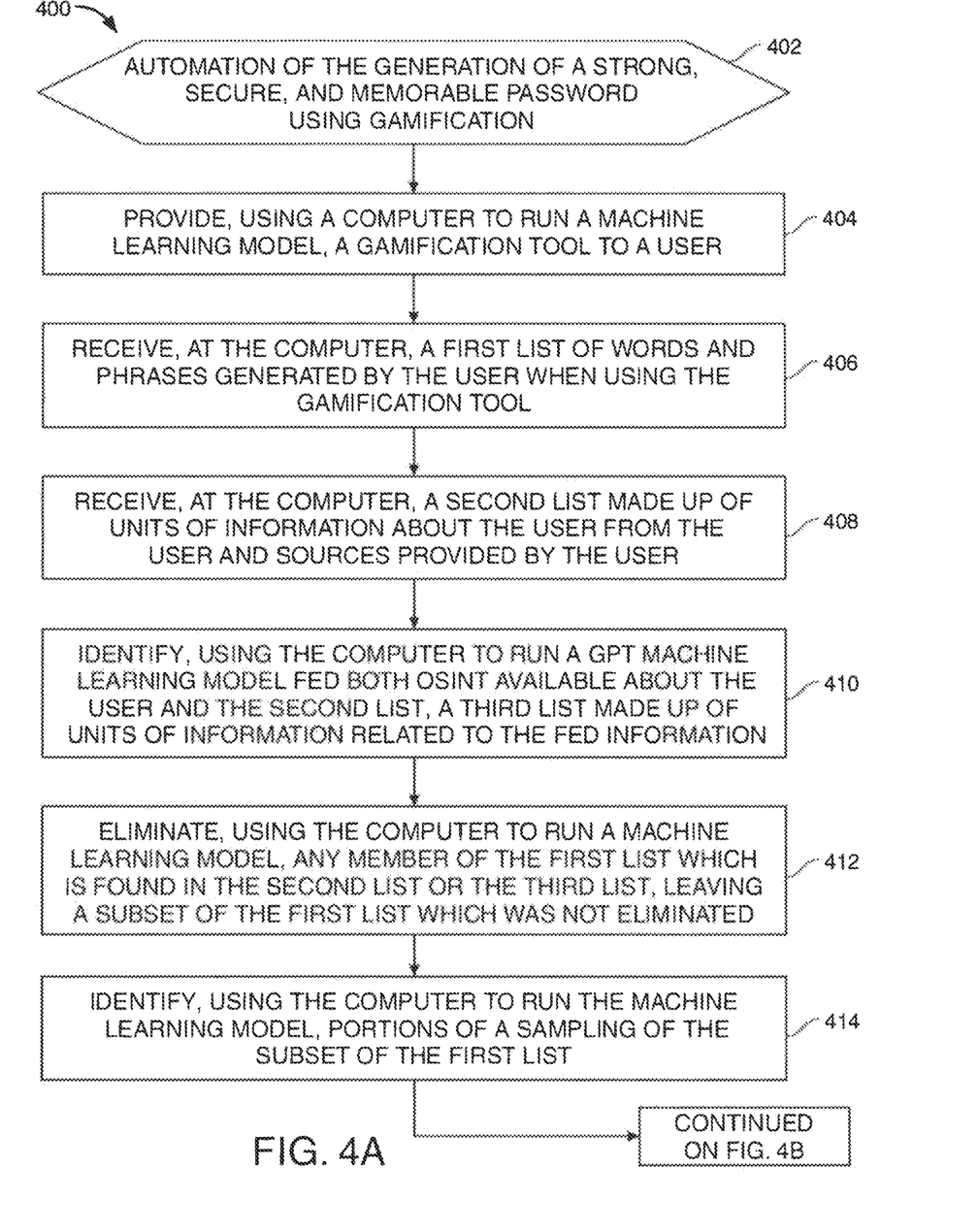
FIG. 4A shows an illustrative flowchart in accordance with principles of the disclosure.

FIG. 4A shows an illustrative flowchart 400, beginning at step 402, which may provide for automation of the generation of a strong, secure, and memorable password using gamification.

At step 404, a computer may run the machine learning model to provide a gamification tool to a user.

At step 406, the computer may receive a first list made up of words and phrases generated by the user when using the gamification tool.

At step 408, the computer may receive a second list made up of units of information about the user which comes from the user and sources provided by the user.

At step 410, the computer running a GPT machine learning model, which may be fed both OSINT available about the user and the second list, may identify a third list made up of units of information related to the fed OSINT and the second list.

At step 412, the computer running a machine learning model may eliminate any member of the first list which is found in the second list or the third list, leaving a subset of the first list which was not eliminated.

At step 414, the computer running the machine learning model may identify portions of a sampling of the subset of the first list. Portions may be a representation of a word or phrase in the first list.

Figure 4B:
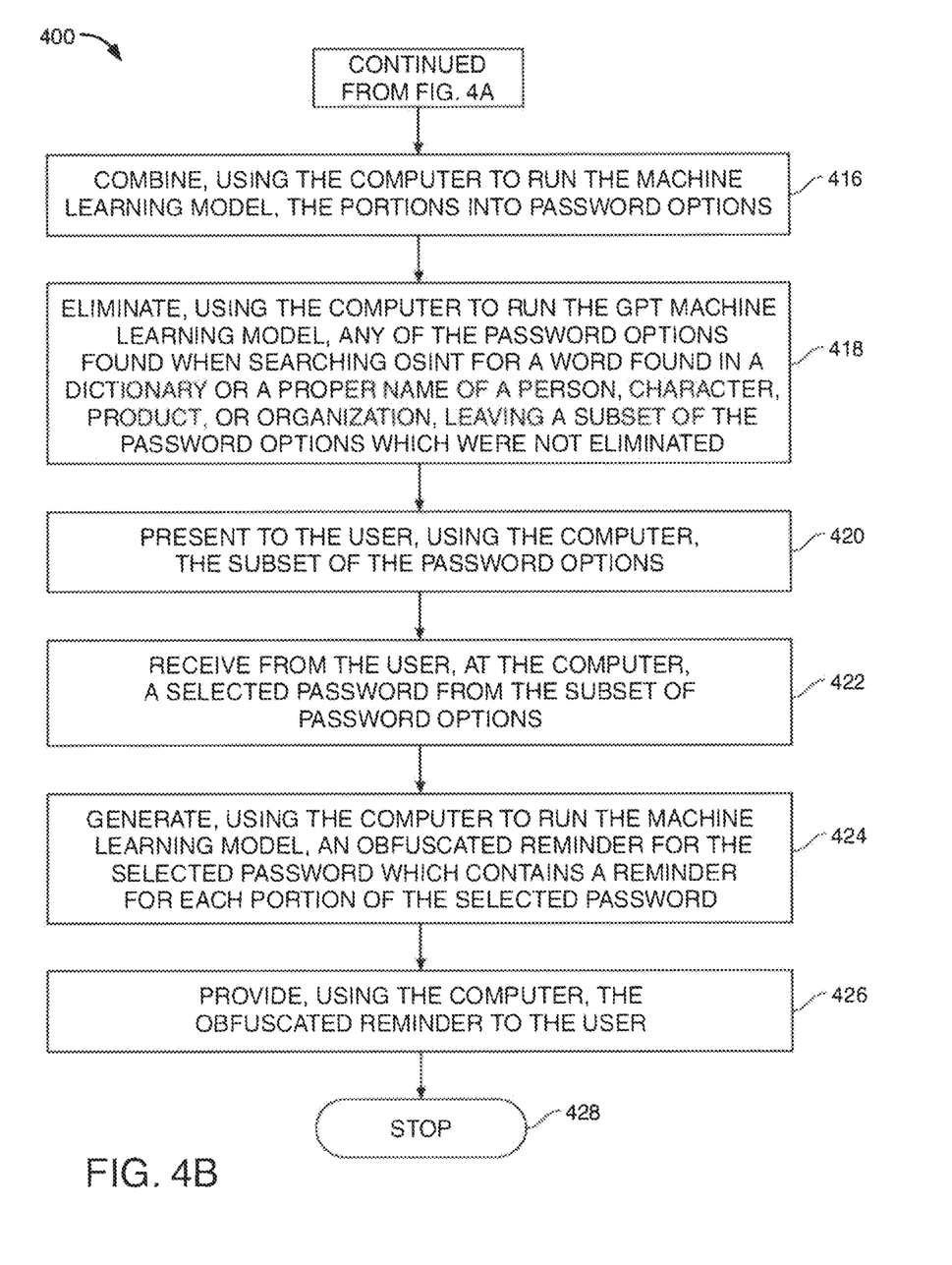
FIG. 4B shows an illustrative flowchart in accordance with principles of the disclosure.

The method continues to FIG. 4B. The method, in FIG. 4B, continues with step 416.

At step 416, the computer running the machine learning model may combine the portions into password options.

At step 418, the computer running the GPT machine learning model may eliminate any of the password options found when searching OSINT for a word found in a dictionary or a proper name of a person, character, product, or organization. Eliminating password options may leave a subset of the password options which were not eliminated.

At step 420, present to the user, using the computer, the subset of the password options.

At step 422, the computer may receive, from the user, a selected password from the subset of password options.

At step 424, the computer running the machine learning model may generate an obfuscated reminder for the selected password which contains a reminder for each portion of the selected password.

At step 426, the computer may provide the obfuscated reminder to the user.

The illustrative flowchart 400 ends at step 428.

Figure 5A:
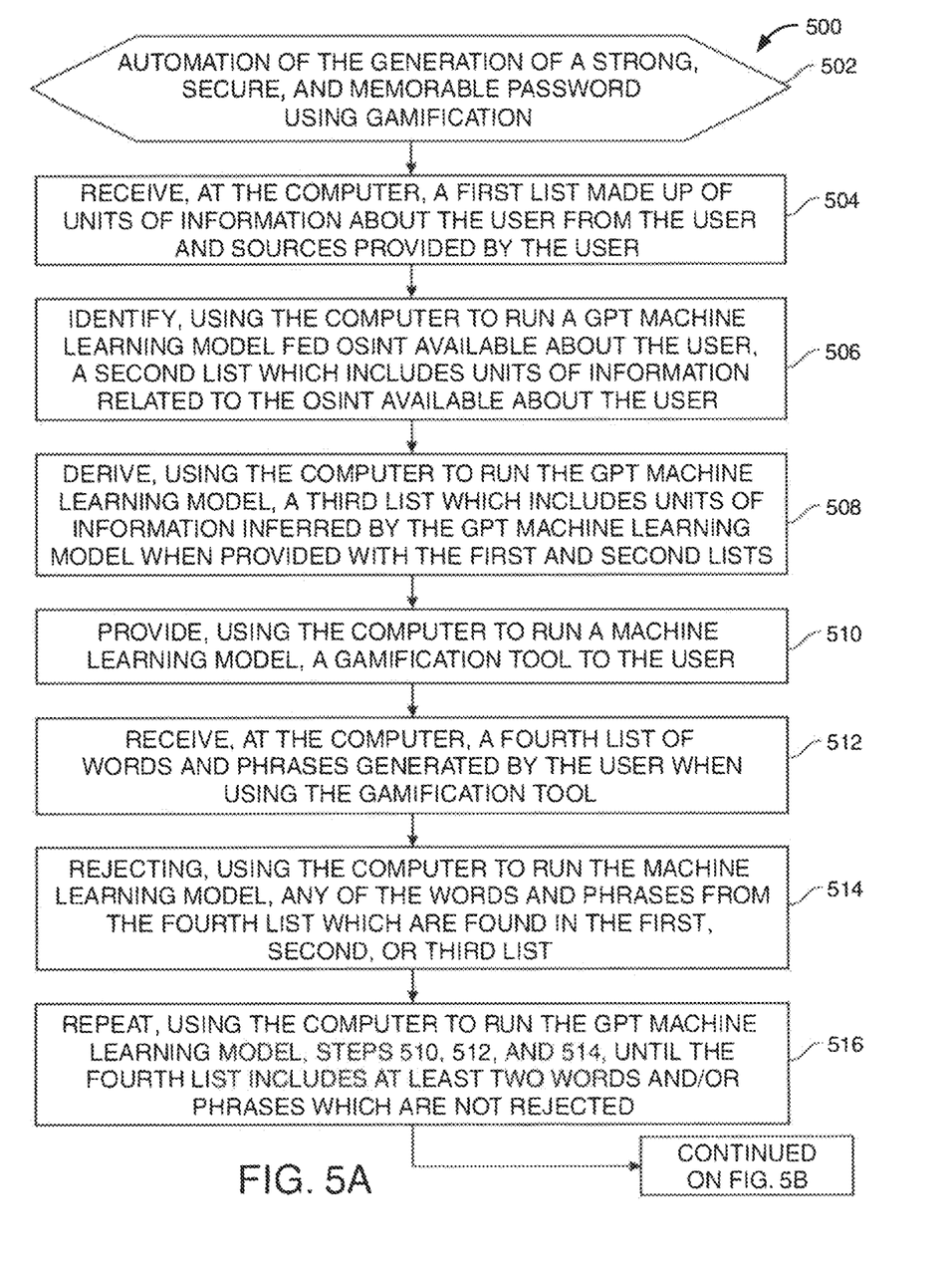
FIG. 5A shows an illustrative flowchart in accordance with principles of the disclosure.

FIG. 5A shows an illustrative flowchart 500, beginning at step 502, which may provide for automation of the generation of a strong, secure, and memorable password.

At step 504, the computer may receive a first list made up of units of information about the user from the user and sources provided by the user.

At step 506, the computer running a GPT machine learning model fed OSINT available about the user may identify a second list which includes units of information related to the OSINT available about the user.

At step 508, the computer running a machine learning model may provide a gamification tool to the user.

At step 510, the computer running the GPT machine learning model may derive a third list which includes units of information inferred by the GPT machine learning model when provided with the first and second lists.

At step 512, the computer may receive a fourth list of words and phrases generated by the user when using the gamification tool.

At step 514, the computer running the machine learning model may reject any of the words and phrases from the fourth list which are found in the first, second, or third list.

At step 516, the computer running the GPT machine learning model may repeat steps 510, 512, and 514, until the fourth list includes at least two words and/or phrases which are not rejected.

Figure 5B:
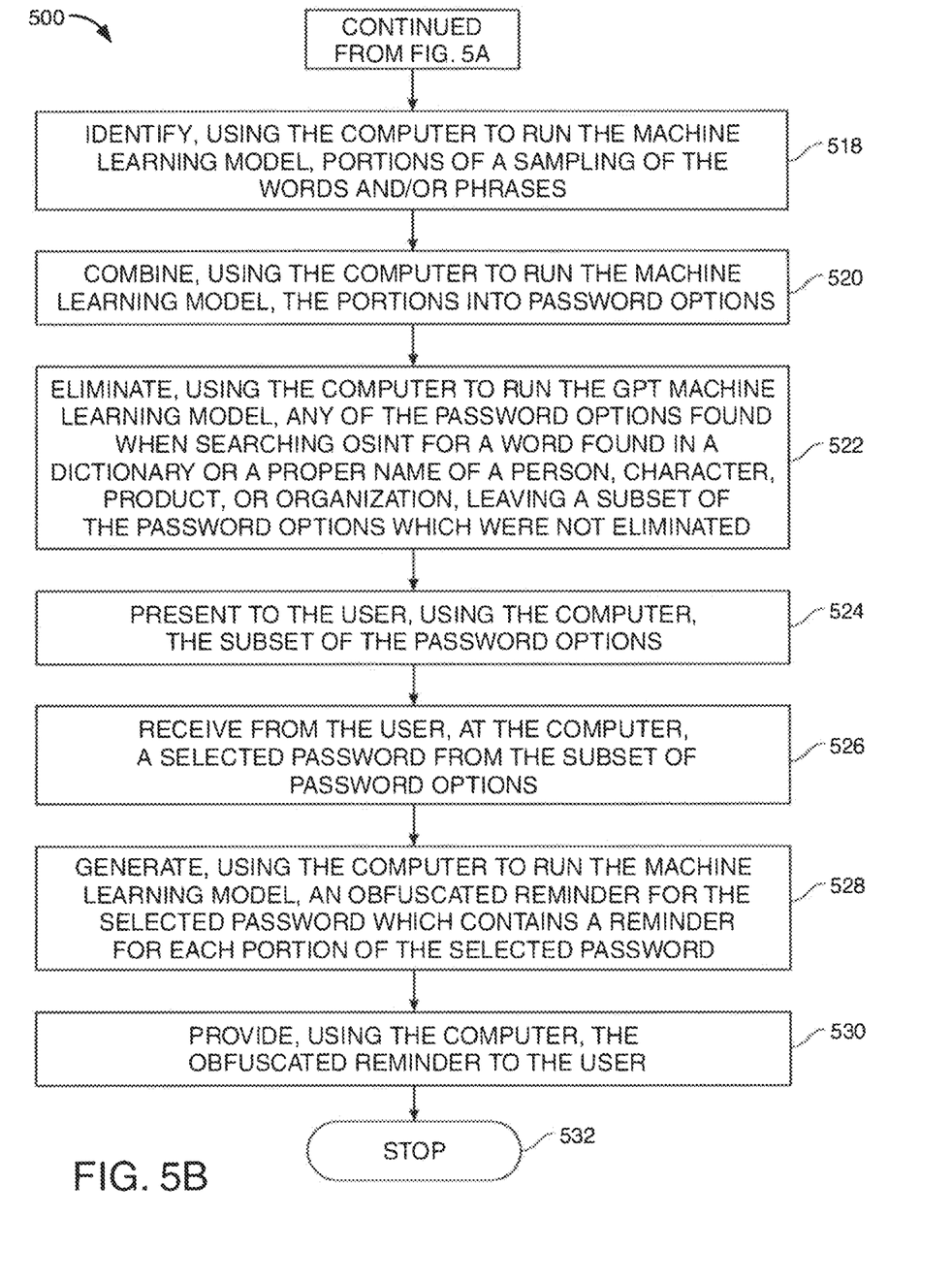
FIG. 5B shows an illustrative flowchart in accordance with principles of the disclosure.

The method continues to FIG. 5B. The method, in FIG. 5B, continues with step 518.

At step 518, the computer running the machine learning model may identify portions of a sampling of the words and/or phrases.

At step 520, the computer running the machine learning model may combine the portions into password options.

At step 522, the computer running the GPT machine learning model may eliminate any of the password options found when searching OSINT for a word found in a dictionary or a proper name of a person, character, product, or organization, leaving a subset of the password options which were not eliminated.

At step 524, the computer may present to the user the subset of the password options.

At step 526, the computer may receive from the user a selected password from the subset of password options.

At step 528, the computer running the machine learning model may generate an obfuscated reminder for the selected password which contains a reminder for each portion of the selected password.

At step 530, the computer may provide the obfuscated reminder to the user.

The illustrative flowchart 500 ends at step 532.

Thus, provided may be systems and methods for automating password generation. Specifically, provided may be systems and methods for using a machine learning model to automate the generation of memorable passwords. Persons skilled in the art will appreciate that the present invention can be practiced by other than the described embodiments, which are presented for purposes of illustration rather than of limitation. The present invention is limited only by the claims that follow.

What is claimed is:

1. A method for automating a generation of a strong, secure, and memorable password using gamification, the method comprising:
   providing, using a computer to run a machine learning model, a gamification tool to a user;
   receiving, at the computer, a first list, the first list being generated by the user when using the gamification tool, the first list comprising words, phrases, or words and phrases;

receiving, at the computer, a second list, the second list comprising units of information about the user from the user and sources provided by the user;

identifying, using the computer to run a generative pre-trained transformer (GPT) machine learning model fed open-source intelligence (OSINT) available about the user and the second list, a third list, the third list comprising units of information related to the OSINT available about the user or to the second list;

eliminating, using the computer to run a machine learning model, any member of the first list which is found in the second list or the third list, leaving a subset of the first list which was not eliminated;

identifying, using the computer to run the machine learning model, portions of a sampling of the subset of the first list;

combining, using the computer to run the machine learning model, the portions into password options;

eliminating, using the computer to run the GPT machine learning model, any of the password options found when searching OSINT for a word found in a dictionary or a proper name of a person, character, product, or organization, leaving a subset of the password options which were not eliminated;

presenting to the user, using the computer, the subset of the password options;

receiving from the user, at the computer, a selected password from the subset of password options;

generating, using the computer to run the machine learning model, an obfuscated reminder for the selected password, the obfuscated reminder containing a reminder for each portion of the selected password; and providing, using the computer, the obfuscated reminder to the user.

2. The method of claim 1, wherein the subset of the first list which was not eliminated comprises at least two words, phrases, or words and phrases.

3. The method of claim 1, wherein the units of information about the user from sources provided by the user comprise:
data storage in a desktop computer, data storage in a laptop computer, data stored in a tablet computer, data stored in a mobile device, data storage on servers in off-site locations, and any combination thereof.

4. The method of claim 1, wherein the selected password is stored using NFT blockchain technology.

5. The method of claim 1, wherein the selected password is not stored on any local device.

6. The method of claim 1, wherein:
the first list is stored in a memory on a local device;
the first list is not stored at a central storage location; and
the first list is erased after a password is selected.

7. The method of claim 1, wherein OSINT comprises:
internet, public government data, media, public commercial data, academic and professional publications, dictionaries, gray literature, and any combinations thereof.

8. The method of claim 1, further comprising:
substituting a character other than a lower-case letter, an upper-case letter, a number for a lower-case letter, an upper-case letter, or a number.

9. The method of claim 1, wherein:
the selected password is a first password; and
the user selects a second password to replace the first password, after a period, using the method of claim 1.

10. The method of claim 1, wherein the obfuscated reminder for the selected password is a first obfuscated reminder, further comprising:

generating, using the computer to run the machine learning model, a second obfuscated reminder for the selected password; and providing, using the computer to run the machine learning model, the second obfuscated reminder to the user when the user cannot remember the selected password when provided with the first obfuscated reminder;

wherein:
the first obfuscated reminder is more obfuscated than the second obfuscated reminder.

11. A method for automating a generation of a strong, secure, and memorable password using gamification by guiding a user, the method comprising:

receiving, at a computer, a first list, the first list comprising units of information about a user from the user and sources provided by the user;

identifying, using the computer to run a generative pre-trained transformer (GPT) machine learning model fed open-source intelligence (OSINT) available about the user, a second list, the second list comprising units of information related to the OSINT available about the user;

deriving, using the computer to run the GPT machine learning model, a third list, the third list comprising units of information which are inferred by the GPT machine learning model from the first list and the second list;

providing, using the computer to run a machine learning model, a gamification tool to the user;

receiving, at the computer, a fourth list, the fourth list generated when using the gamification tool, the fourth list comprising words, phrases, or words and phrases;

rejecting, using the computer to run the machine learning model, any of the words, phrases, or words and phrases from the fourth list which are found in the first list, the second list, or the third list;

repeating, using the computer to run the GPT machine learning model, the steps of providing gamification to the user, receiving additional words, phrases, or words and phrases generated by the user using the gamification, and rejecting any of the additional words, phrases, or words and phrases which are found in the first list, the second list, or the third list, until the fourth list comprises two or more words, phrases, or words and phrases which are not rejected;

identifying, using the computer to run the machine learning model, portions of a sampling of the two or more words, phrases, or words and phrases;

combining, using the computer to run the machine learning model, the portions into password options;

eliminating, using the computer to run the GPT machine learning model, any of the password options found when searching OSINT for a word found in a dictionary or a proper name of a person, character, product, or organization, leaving a subset of the password options which were not eliminated;

presenting to the user, using the computer, the subset of the password options;

receiving from the user, at the computer, a selected password from the subset of password options;

generating, using the computer to run the machine learning model, an obfuscated reminder for the selected password, the obfuscated reminder containing a reminder for each portion of the selected password; and providing, using the computer, the obfuscated reminder to the user.

12. The method of claim 11, wherein:
the fourth list is stored in a memory local on a local device;
the fourth list is not stored at a central storage location; and
the fourth list is erased after a password is selected.

13. The method of claim 11, wherein OSINT comprises:
internet, public government data, media, public commercial data, academic and professional publications, dictionaries, gray literature, and any combinations thereof.

14. The method of claim 11, further comprising:
substituting a character other than a lower-case letter, an upper-case letter, a number for a lower-case letter, an upper-case letter, or a number.

15. A system for automated generation of a strong, secure, and memorable password with the use of gamification, the system comprising:
a computer;
a first machine learning model for running on the computer;
a second machine learning model, the second machine learning model being a generative pre-trained transformer (GPT) machine learning model for running on the computer;
the computer configured to:
use the first machine learning model to provide a gamification tool to a user;
receive a first list from the user, the first list generated when using the gamification tool, the first list comprising words, phrases, or words and phrases;
receive a second list, the second list comprising units of information about the user from the user and from sources provided by the user;
use the second machine learning model to populate a third list comprising units of information obtained from open-source intelligence (OSINT) identified about the user;
use the second machine learning model to generate a fourth list comprising units of information related to the second list and the third list;
use the first machine learning model to eliminate any member of the first list which is found in the second list, the third list, or the fourth list, leaving a subset of the first list which were not eliminated;
use the first machine learning model to identify portions of a sampling of the subset of the first list;
use the first machine learning model to combine the portions into password options;
use the second machine learning model to eliminate any of the password options found when searching OSINT for a word found in a dictionary or a proper name of a person, character, product, or organization, leaving a subset of the password options which were not eliminated;
present to a user the subset of the password options;
receive from the user a selected password from the subset of password options;
use the first machine learning model to generate an obfuscated reminder for the selected password, the obfuscated reminder containing a reminder for each portion of the selected password; and
provide the obfuscated reminder to the user.

16. The system of claim 15, wherein:
the second machine learning model includes the first machine learning model.

17. The system of claim 15, wherein:
the first list is stored in a memory local on a local device;
the first list is not stored at a central storage location; and
the first list is erased after a password is selected.

* * * * *